United States Patent
Ide

[11] Patent Number: 5,726,641
[45] Date of Patent: Mar. 10, 1998

[54] SELECTIVE CALLING RECEIVER

[75] Inventor: Motoki Ide, Tokyo, Japan

[73] Assignee: NEC Corporation, Japan

[21] Appl. No.: 850,651

[22] Filed: May 2, 1997

Related U.S. Application Data

[63] Continuation of Ser. No. 467,845, Jun. 6, 1995, abandoned.

[30] Foreign Application Priority Data

Jun. 15, 1994 [JP] Japan ..................... 6-133038

[51] Int. Cl.$^6$ .................. G06F 13/00; G06F 12/00; H04B 7/00; G08B 3/10
[52] U.S. Cl. .................. 340/825.22; 340/825.44; 340/825.47; 395/430; 395/575; 364/200
[58] Field of Search .................. 340/825.22, 825.44; 395/430, 575, 650, 725, 183, 185; 371/20.1, 20.4, 21.1

[56] References Cited

U.S. PATENT DOCUMENTS

| | | | |
|---|---|---|---|
| 4,141,068 | 2/1979 | Mager et al. | 364/200 |
| 4,839,628 | 6/1989 | Davis et al. | 340/825.22 |
| 5,043,718 | 8/1991 | Shimura | 340/825.44 |
| 5,247,519 | 9/1993 | Snowden et al. | 370/94.1 |
| 5,390,324 | 2/1995 | Burckhartt et al. | 395/575 |
| 5,564,030 | 10/1996 | Whitted, III et al. | 395/411 |

FOREIGN PATENT DOCUMENTS

| | | |
|---|---|---|
| 347938 | 12/1989 | European Pat. Off. . |
| 553733 | 8/1993 | European Pat. Off. . |

*Primary Examiner*—Michael Horabik
*Assistant Examiner*—Yonel Beaulieu
*Attorney, Agent, or Firm*—Ostrolenk, Faber, Gerb & Soffen, LLP

[57] ABSTRACT

A selective calling receiver operated by causing a processor to execute a prestored program includes a non-writable mask ROM prestoring the program, a patch register for storing a patch address, a programmable patch memory for storing a patch program, a comparator for detecting a coincidence between a value of the patch register and an instruction code fetch address, and a patch control circuit for controlling the microprocessor so as to execute the patch program in the patch memory.

17 Claims, 5 Drawing Sheets

SELECTIVE CALLING RECEIVER

This is a Continuation of application Ser. No. 08/467,845, filed on Jun. 6, 1995, now abandoned.

BACKGROUND OF THE INVENTION

1. Field of the Invention

The present invention relates to a selective calling receiver and, more particularly, to a selective calling receiver for realizing its function by programming software.

2. Description of the Related Art

In recent years, selective calling receivers called "pocket bells" often carried by users to send selective call signals in emergencies have been very popular. Such a selective calling receiver has a function of informing a user of an incoming call upon reception of a selective call signal, a function of displaying an incoming message, and the like. A microprocessor is usually used to realize and control these functions using a software program.

The program for realizing the functions of the selective calling receiver is stored in a ROM in the selective calling receiver. A non-writable mask ROM is used as this ROM because of a low cost.

A variety of functions tend to be recently required for even selective calling receivers. To realize the variety of functions, a large program capacity is required, and a probability of program errors, i.e., bugs left without being found in a program test, is increasing.

When a bug is found in a selective calling receiver product, a method of recovering this selective calling receiver product and providing the product from which the bug is corrected is conventionally used. In this case, the recovered selective calling receiver is wasted to suffer a great loss.

It is assumed that the ROM which stores the program is comprised of not a mask ROM but a programmable ROM (e.g., an EPROM or EEPROM), and a program from which a bug is corrected can be stored in the programmable ROM again. In this case, a programmable ROM having a capacity capable of storing a large program is expensive, resulting in a high-cost selective calling receiver.

A ROM replaceable through a socket or the like can reduce the cost because the ROM is replaced with a new one upon detection of a bug. In this case, another problem is posed on arranging a compact selective calling receiver. When the ROM is connected through a socket or the like, contact failures may occur in long-term use of the selective calling receiver.

SUMMARY OF THE INVENTION

The present invention has been made in consideration of the above point, and has as its object to provide a selective calling receiver capable of correcting a program bug without wasting the selective calling receiver or using an expensive programmable ROM for storing a program even if the program bug is found in the selective calling receiver product.

In order to achieve the above object according to the basic aspect of the present invention, there is provided a selective calling receiver operated by causing a processor to execute a prestored program, comprising a non-writable mask ROM prestoring the program, a patch register for storing a patch address, a programmable patch memory for storing a patch program, a comparator for detecting a coincidence between a value of the patch register and an instruction code fetch address, and a patch control circuit for controlling the microprocessor so as to execute the patch program started in the patch memory.

In order to achieve the above object according to another aspect of the present invention, in addition to the basic aspect, there is provided a selective calling receiver, further comprising a programmable ROM for storing patch data consisting of the patch address and the patch program, so that the patch address of the patch data is stored in the patch register, and a boot program for storing the patch program of the patch data in the patch memory is prestored in the mask ROM.

In the above aspect, the programmable ROM for storing the patch data is the same as the programmable ROM for storing a selective call number of a home selective calling receiver.

There is also provided patch data receiving means for receiving the patch data from an external patch data setting unit and storing the patch data in the programmable ROM.

There is further provided patch data receiving means for receiving the patch data as message information of a selective call signal and storing the patch data in the programmable ROM.

According to the selective calling receiver of the present invention, when the comparator detects a coincidence between the instruction code fetch address and the patch address stored in the patch register, the patch control circuit controls the microprocessor so as to execute the patch program stored in the patch memory.

As described above, an unusable selective calling receiver must be conventionally discarded even in the presence of a slight program error. According to the present invention, however, the program can be patched to correct the program using this patch. Therefore, the selective calling receiver can be used again.

When the ROM which stores the program is a mask ROM, a program correction period usually takes one month or more. According to the present invention, however, this period can be greatly shortened, thereby minimizing the loss of a business chance.

When the ROM which stores the program is a programmable ROM, although the program correction period can be shortened as in the selective calling receiver of the present invention, the programmable ROM is more expensive than the mask ROM, resulting in an expensive selective calling receiver. According to the present invention, since the expensive programmable ROM is not used to store the program, the manufacturing cost of the selective calling receiver can also be reduced.

According to the present invention, the program can be updated while a memory device is kept mounted in the selective calling receiver. In particular, when the program is updated using a radio channel, the program can be updated in a remote operation without recovering the selective calling receiver. In addition, the programs in a large number of selective calling receivers can be simultaneously updated.

According to the present invention, the time and economical losses caused by program bugs of the selective calling receiver can be greatly reduced.

DETAILED DESCRIPTION OF THE PREFERRED EMBODIMENT

The present invention will be described in detail with reference to the accompanying drawings.

Figure 1:
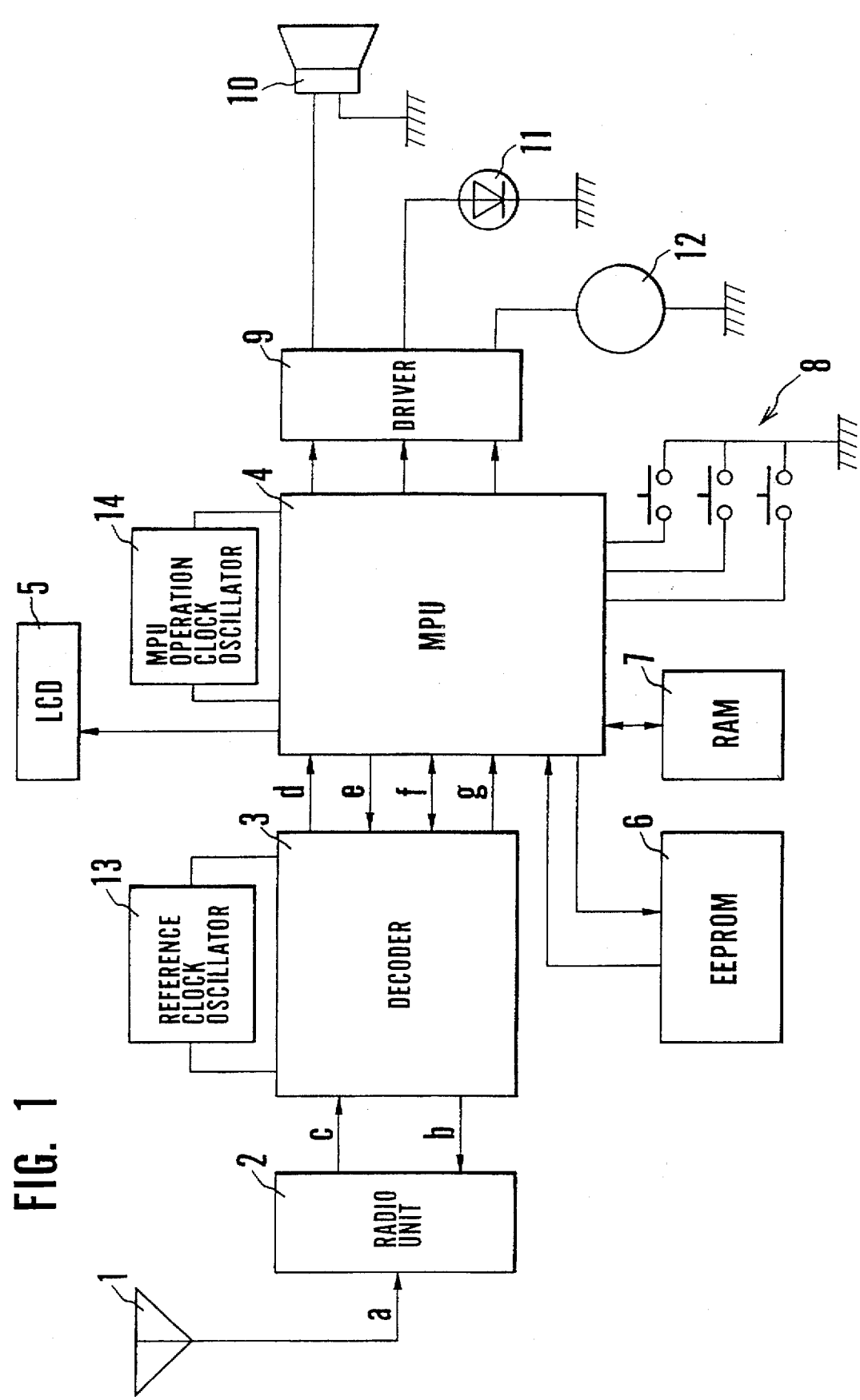
FIG. 1 is a block diagram of a selective calling receiver according to an embodiment of the present invention.

FIG. 1 is a block diagram showing a selective calling receiver according to an embodiment of the present invention.

The selective call number of a home selective calling receiver is prestored in an EEPROM 6. An MPU (microprocessor unit) 4 reads out this selective call number from the EEPROM 6 and sets this number in a decoder 3 through an address bus e and a data bus f. The selective calling receiver reduces the power consumption by an intermittent reception operation to be described later with reference to FIGS. 3A and 3B. For this purpose, in order to perform this intermittent reception operation, a battery saving control signal b is output to a radio unit 2 so as to ON/OFF-control the power supply voltage applied to the radio unit 2.

A radio signal a received by an antenna 1 is demodulated by the radio unit 2 and output as demodulated data c to the decoder 3. The decoder 3 collates the demodulated data c with the preset selective call number of the home selective calling receiver. If a coincidence is detected, the decoder 3 outputs, to the MPU 4, an interrupt signal d representing that the selective call signal for calling the home selective calling receiver has been received. At the same time, the decoder 3 outputs the demodulated data c to the MPU 4 through the address bus e and the data bus f.

This processing in the decoder 3 is performed using a reference clock g from a reference clock oscillator 13 and an oscillation circuit 309 (to be described later) as an operating clock. This reference clock g is also output to the MPU 4.

The MPU 4 uses the reference clock g as the operating clock to store message information following the received selective call signal in the buffer memory area of a RAM 7. The MPU 4 uses the clock from an MPU operation clock oscillator 14 as an operating clock to convert the message information in the buffer memory area of the RAM 7 into character data. The MPU 4 then stores this character data in a message memory area in the RAM 7.

The MPU 4 informs the user that the incoming call has been received by the selective calling apparatus. This informing means can be selected when the user sets a function switch 8. In this embodiment, the user can select a buzzer sound from a loudspeaker 10, an ON operation of an LED 11, or a vibration from a vibrator 12. This informing operation can be set operating one of the above three informing means or simultaneously operating a plurality of informing means. The MPU 4 displays the message information stored in the RAM on an LCD (liquid crystal display) 5.

A selective call signal received by the selective calling receiver shown in FIG. 1 will be described below.

Figure 2A:
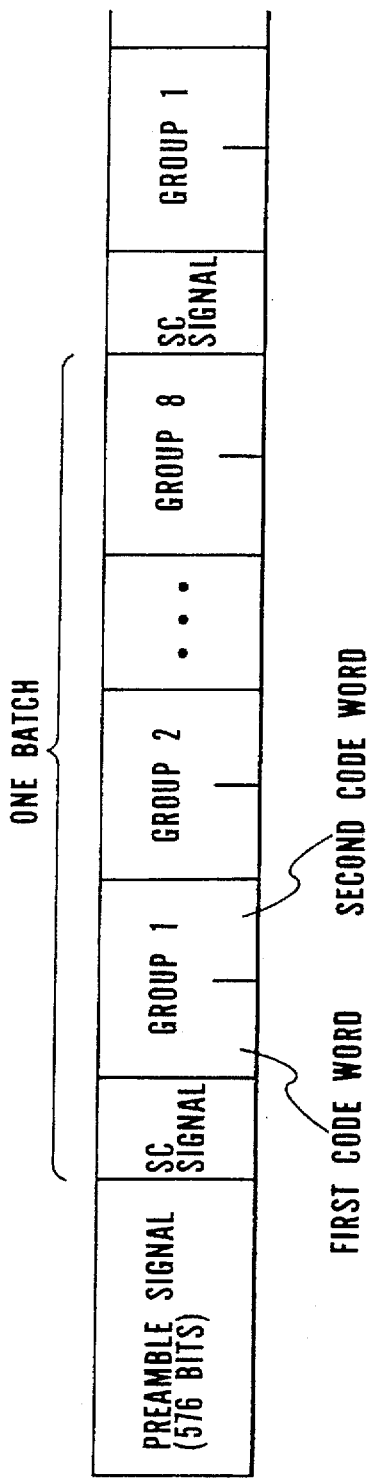
FIG. 2A is a format of a selective call signal received in the receiver shown in FIG. 1.
Figure 2B:
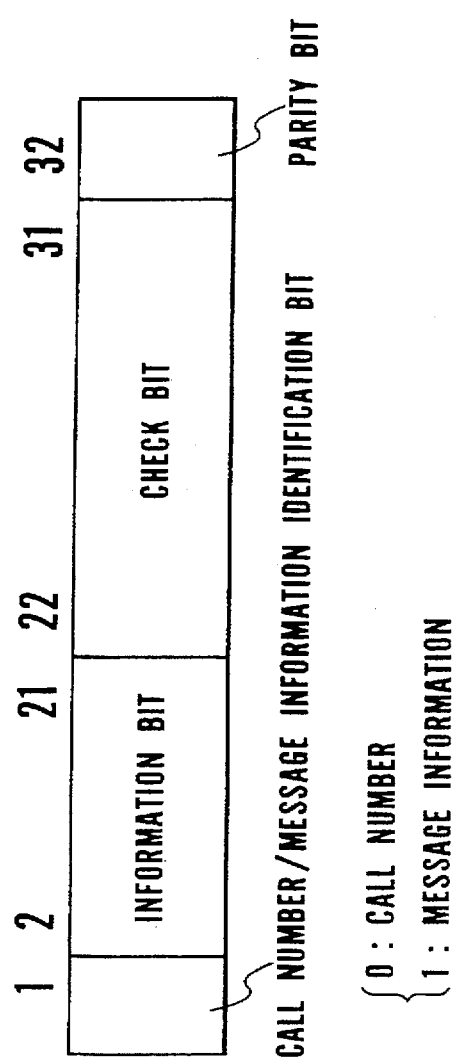
FIG. 2B is a format of each code word in the selective call signal.

FIG. 2A shows the format of a selective call signal received by the selective calling receiver shown in FIG. 1, and FIG. 2B shows the format of each code word in the selective call signal.

A signal on the transmitting side, i.e., a signal to be transmitted from a base station has a format in which a 32-bit SC signal follows a 576-bit preamble signal, as shown in FIG. 2A. The preamble signal and the SC signal are used on a receiving side to establish synchronization with a transmitting side.

Each individual selective calling receiver belongs to one of several groups. A selective call signal for calling a home selective calling receiver is transmitted for only a period assigned to a group (to be referred as to a home group hereinafter) to which the home selective calling receiver belongs. When the selective calling receiver is powered on, and synchronization is established upon reception of the preamble signal and the SC signal, this selective calling receiver performs reception for only the period assigned to the home group. The intermittent reception operation for performing reception for only the period assigned to the home group will be described later with reference to FIGS. 3A and 3B.

As shown in FIG. 2A, a selective call signal corresponding to each selective calling receiver of each group is transmitted following the SC signal. When transmission of selective call signals to all the groups (FIG. 2A shows eight groups) is completed, a selective call signal for each selective calling receiver of each group is transmitted upon retransmission of an SC signal.

The selective call signal for each selective calling receiver of each group consists of two code words, i.e., the first and second code words. The SC signal and the selective call signals for selective calling receivers of all the groups are called one batch.

Each code word of the selective call signal has the format shown in FIG. 2B. More specifically, each code word consists of a 32-bit code constituted by a call number/message information identification bit (to be referred to as an identification bit hereinafter), information bits, check bits, and a parity bit in an order named.

The identification bit consists of one bit which represents the selective call number or message information of a selective calling receiver to be called. If the identification bit is "0", the corresponding code word represents a selective call number. However, if the identification bit is "1", the corresponding code word represents message information.

The information bits are 10 bits. If the identification bit is "0", the call number of a selective call receiver to be called is set in the information bits. However, if the identification bit is "1", message information is set in the information bits.

The check bits are 10 bits, and the parity bit consists of one bit. That is, a transmission error is corrected using a (31.21)+1BCH code.

Figure 3A:
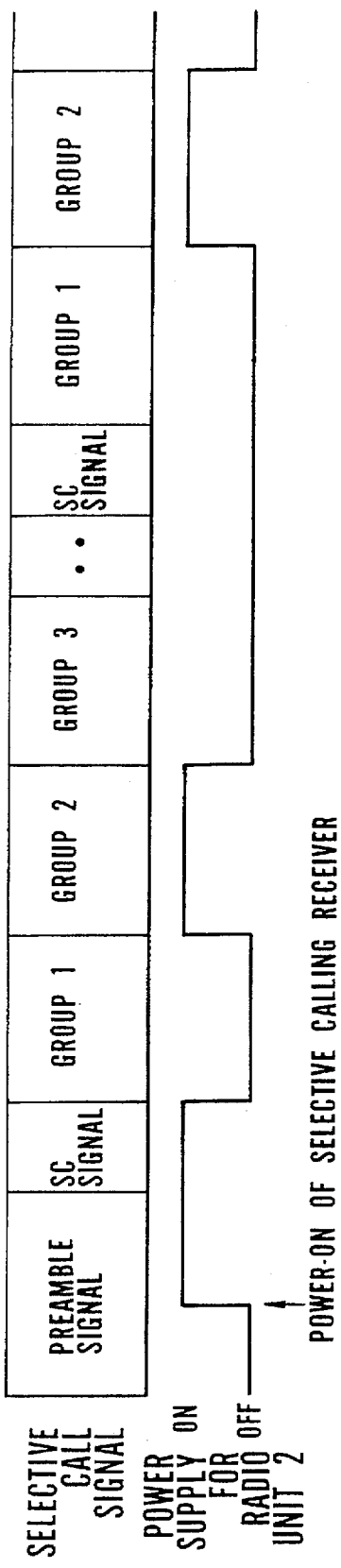
FIG. 3A is a view for explaining an intermittent reception operation in a non-reception mode, which is performed in the receiver shown in FIG. 1.
Figure 3B:
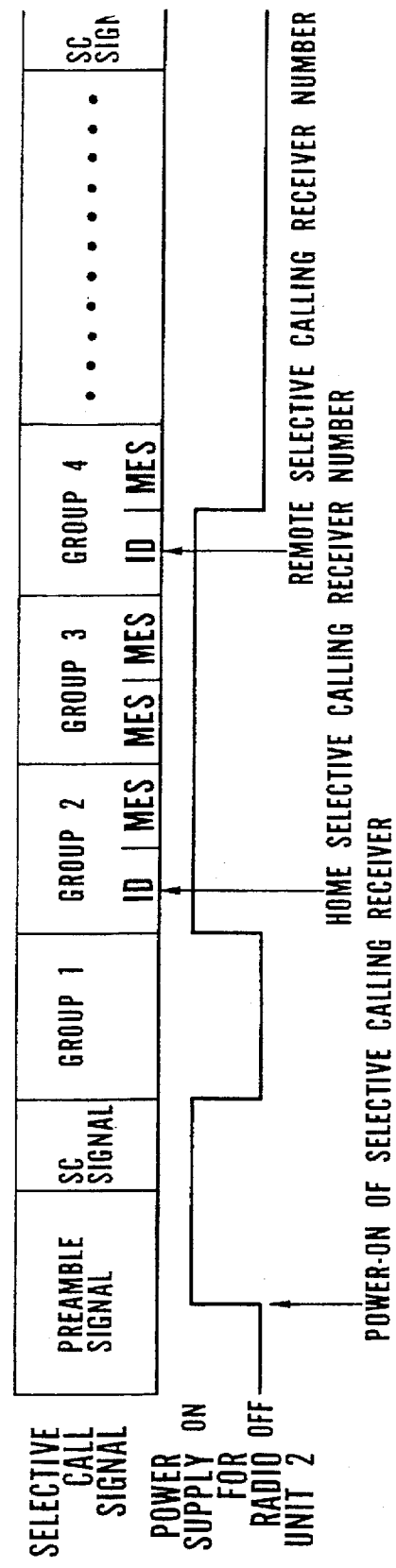
FIG. 3B is a view for explaining an intermittent reception operation in a reception mode, which is performed in the receiver shown in FIG. 1.

FIGS. 3A and 3B are views for explaining the intermittent reception operation performed by the selective calling receiver shown in FIG. 1. FIG. 3A shows a non-reception mode in which a selective call signal for calling the home selective calling receiver is not received, and FIG. 3B shows a reception mode in which the selective call signal for calling the home selective calling receiver has been received.

When the selective calling receiver is powered on, the radio unit 2 is also powered on to start reception of a selective call signal from the transmitting side.

The selective calling receiver is set in a preamble search mode until a preamble signal is received. In this mode, the selective calling receiver continuously performs reception with a battery saving mode. When the selective calling receiver receives a preamble signal and an SC signal following the preamble signal, the selective calling receiver establishes synchronization with the transmitting side.

As described above, the EEPROM 6 of the selective calling receiver prestores the call number of the home selective calling receiver and the home group. FIGS. 3A and 3B are views showing a case in which the selective calling receiver belongs to group #2. After the preamble signal and the SC signal are received and synchronization with the transmitting side is established, the power supply for the radio unit 2 is kept off except for a period in which a selective call signal for the selective calling receiver belonging to group #2 is transmitted, thereby performing the intermittent reception operation. With this arrangement, the power consumption of the selective calling receiver can be reduced, and this state is called a selective call number search mode.

In the non-reception mode in which the selective call signal for calling the home selective calling receiver is not received, as shown in FIG. 3A, the power supply for the radio unit 2 is turned on for a period in which the selective call signal for the selective calling receiver belonging to group #2 is transmitted.

On the other hand, FIG. 3B shows a state in which the selective call signal for calling the home selective calling receiver has been received. More specifically, when the identification bit of the selective call signal for the selective calling receiver of group #2 is "0" and the call number of the home selective calling receiver is set in the information bits, reception continues until a code word having an identification bit of "0" is transmitted because a message for the home selective calling receiver can be transmitted for a period in which selective call signal for selective calling receivers of other groups are transmitted.

Referring to FIG. 3B, ID represents a code word having an identification bit of "0" representing a selective call signal; and MES, a code word having an identification bit of "1" representing message information. In FIG. 3B, the call number of the home selective calling receiver is set in the first code word of the selective call signal for the selective calling receiver of group #2. The identification bit goes to "0" for the first time in the first code word of the selective call signal for the selective calling receiver of group #4. In this case, the home selective calling receiver provides continuous reception from the first code word of the selective call signal for the selective calling receiver of group #2 to that of group #4.

Message information for the home selective calling receiver is set from the second code word of the selective call signal for the selective calling receiver of group #2 to that of group #3. The selective calling receiver stores this message information in the RAM 7.

During this period, the intermittent reception operation is controlled by a battery saving control signal b from the decoder 3.

The operation of the decoder 3 will be described below in detail.

Figure 4:
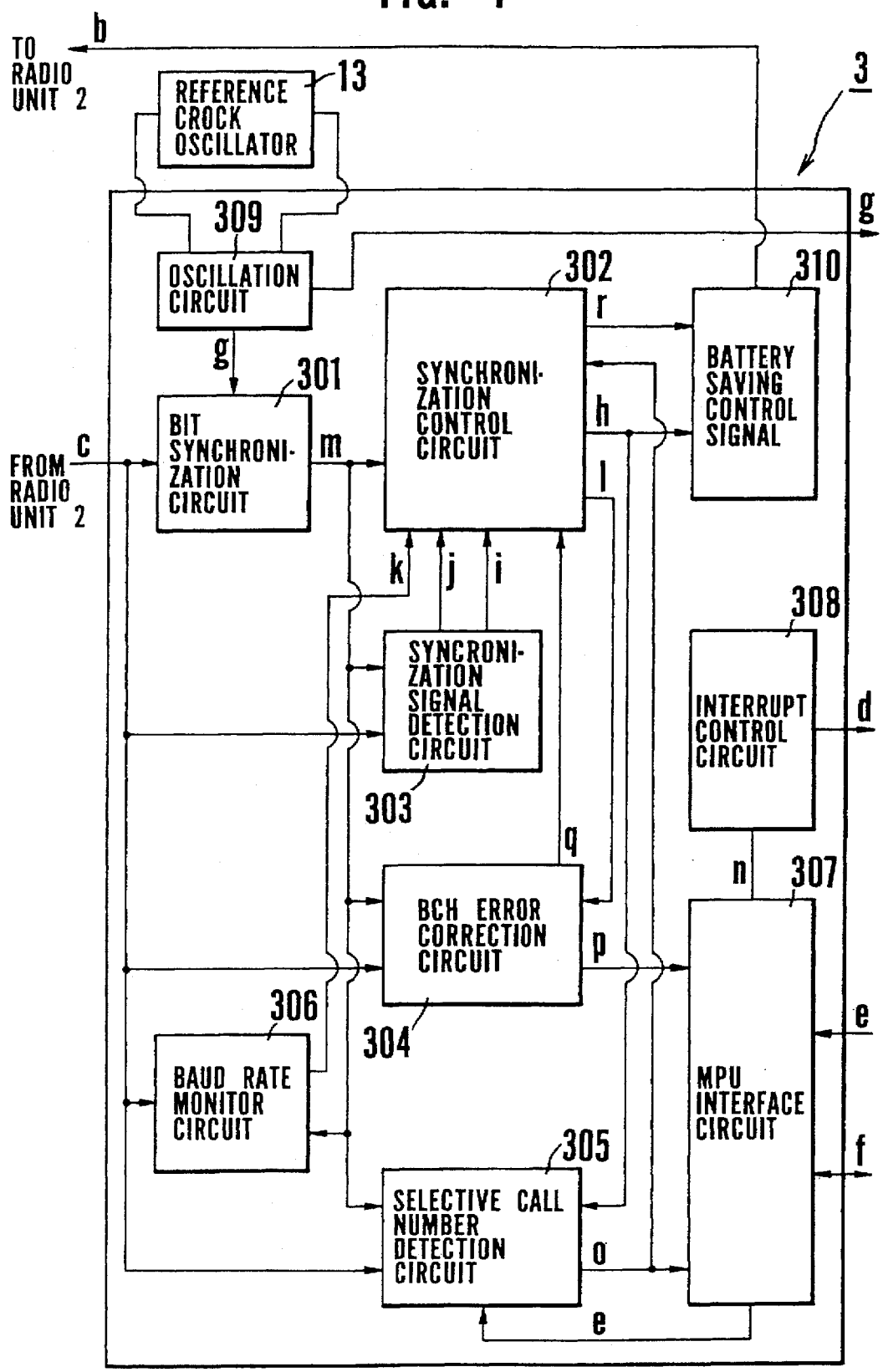
FIG. 4 is a block diagram showing the internal arrangement in the receiver shown in FIG. 1.

FIG. 4 is a block diagram showing the internal arrangement of the decoder 3 shown in FIG. 1.

The oscillation circuit 309 causes the reference clock oscillator 13 to generate the reference clock g and supplies the reference clock g to a bit synchronization circuit 301 and the MPU 4.

The bit synchronization circuit 301 generates a reproduction clock m in accordance with the reference clock g from the oscillation circuit 309 and the demodulated data. This reproduction clock m is supplied to a synchronization control circuit 302, a synchronization signal detection circuit 303, a BCH error correction circuit 304, a selective call number detection circuit 305, and a baud rate monitor circuit 306.

The baud rate monitor circuit 306 compares the demodulated data c with the reproduction clock m from the bit synchronization circuit 301. When the demodulated data c has a bit rate for a selective call signal of a POCSAG scheme (to be referred to as a POCSAG signal hereinafter), the baud rate monitor circuit 306 outputs a bit rate detection signal k. This bit rate detection signal k is used to start an operation, which makes it difficult to detect an SC signal, from the battery saving operation in a state (preamble search mode) in which POCSAG signal is not received. The bit rate detection signal k is also used to cancel the battery saving operation in the preamble search mode upon reception of the POCSAG signal even if the reception signal is a signal except for the preamble signal.

The synchronization signal detection circuit 303 samples the demodulated data c in accordance with the reproduction clock m from the bit synchronization circuit 301. Upon detection of a preamble signal, the synchronization signal detection circuit 303 outputs a preamble detection signal i. When an SC signal is detected, the synchronization signal detection circuit 303 outputs an SC detection signal j.

The synchronization control signal 302 is a circuit for establishing/canceling synchronization. In a state in which the POCSAG signal is not received, the selective calling receiver performs the battery saving operation in the preamble search mode, as described above. When the synchronization control circuit 302 receives the preamble detection signal i from the synchronization signal detection circuit 303 or the bit rate detection signal k from the baud rate monitor circuit 306, the synchronization control circuit 302 outputs a continuous reception designation signal r for designating to shift the operation from the battery saving operation in the preamble search mode to the continuous reception operation.

When the synchronization control circuit 302 receives the SC detection signal j from the synchronization signal detection circuit 303, the selective calling receiver is set in the selective call number search mode and starts the battery saving operation as the intermittent reception operation. In this mode, when the synchronization control circuit 302 receives a selective call number coincidence signal o from the selective call number detection circuit 305 (to be described in detail later), the synchronization control circuit 302 outputs the continuous reception designation signal r for designating a change in operation from the battery saving operation in the selective call number search mode to the continuous reception operation to receive the subsequent message information, as shown in FIG. 3B.

In the synchronized state wherein synchronization is established, the synchronization control circuit 302 outputs a code word timing signal 1 representing the timing of each code word shown in FIG. 2A.

The synchronization control circuit 302 also outputs a home group signal h at a timing of the selective call signal for the home group.

The BCH error correction circuit 304 corrects the error of the demodulated data c at a timing of the code word timing signal 1 from the synchronization control circuit 302. The BCH error correction circuit 304 outputs error-corrected message data p to the MPU 4 through an MPU interface circuit 307.

In the synchronized state, the BCH error correction circuit 304 detects the data error of the demodulated data c and outputs an error detection signal q to the synchronization control circuit 302. Upon reception of the error detection signal q, the synchronization control circuit 302 counts the number of data errors of the two code words for the home group. When the number of data errors reaches a predetermined count, the BCH error correction circuit 304 cancels the synchronized state to change the mode to the preamble search mode.

The selective call number detection circuit 305 collates the selective call number of the home selective calling receiver with the selective call number of the demodulated data c at a timing of the home group signal h from the synchronization control circuit 302. If a coincidence is established, the selective call number detection circuit 305 outputs the selective call number coincidence signal o to the synchronization control circuit 302 and to the MPU 4 through the MPU interface circuit 307.

The MPU interface circuit 307 is a circuit for interfacing with the MPU 4. The MPU 4 exchanges data with external devices through this MPU interface circuit 307.

An interrupt control circuit 308 is a circuit for outputting the interrupt signal d to the MPU 4. The interrupt control circuit 308 outputs the interrupt signal d when data to be sent to the MPU 4 is present or when an interrupt request signal n is output from the MPU interface circuit 307 upon a change in state.

A battery saving circuit 310 outputs the battery saving control signal b for ON/OFF-controlling the power supply for the radio unit 2 on the basis of the home group signal h or the continuous reception designation signal r from the synchronization control circuit 302.

Figure 5:
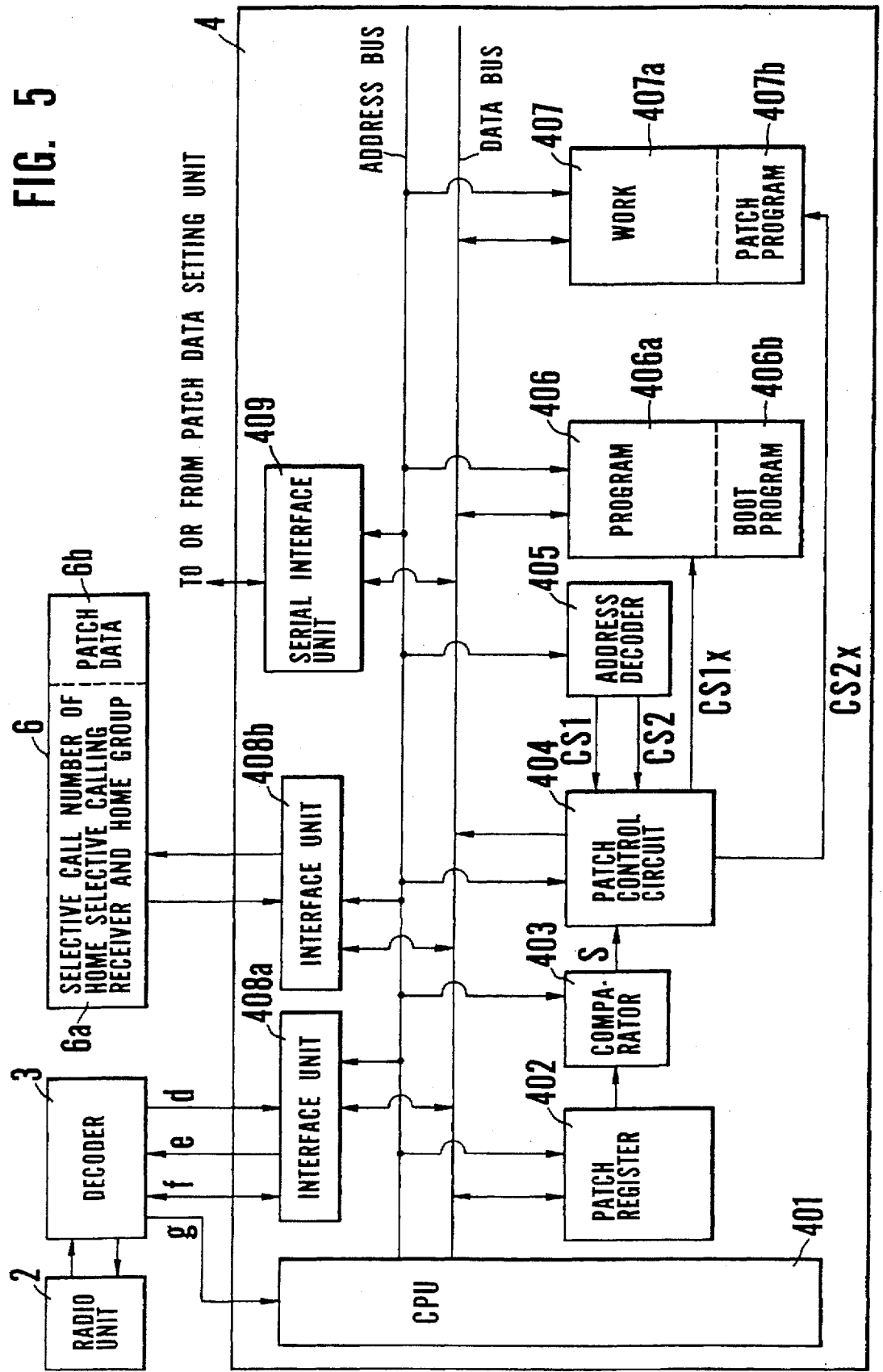
FIG. 5 is a block diagram showing the internal arrangement of an MPU in the receiver shown in FIG. 1.

FIG. 5 is a block diagram showing the internal arrangement of the MPU 4 shown in FIG. 1.

In the selective calling receiver of the present invention, a program is patched upon detection of a program bug, thereby correcting the program bug.

The MPU 4 comprises a CPU 401, a comparator 403, an address decoder 405, the latter two of which are connected to the address bus of the CPU 401, a patch register 402 connected to the address and data buses of the CPU 401, a patch control circuit 404, a ROM 406, a RAM 407, an interface unit 408a, an interface unit 408b, and a serial interface unit 409.

The interface unit 408a interfaces with the CPU 401 and the decoder 3 shown in FIG. 1. The interface unit 408b interfaces with the CPU 401 and the EEPROM 6 shown in FIG. 1. The serial interface unit 409 interfaces with a patch data setting unit constituted by an external personal computer or the like. The patch data setting unit will be described later.

The EEPROM 6 includes an area 6a in which the selective call number of the home selective calling receiver and the home group are prestored and an area 6b for storing patch data. The area 6b is empty at the beginning (i.e., a program is not patched). The ROM which prestores the selective call number of the home selective calling receiver and the home group comprises a conventional programmable EEPROM. Use of the EEPROM is not novel in the present invention. The EEPROM is used because the MPU 4 can change the contents of the ROM if the selective call number of the home selective calling receiver and the home group are to be updated.

The mask ROM 406 has an area in which a program for realizing the function of the selective calling receiver is prestored, and an area 406b in which a boot program for initialization upon power-ON operation of the selective calling receiver is prestored.

When a bug is found in the program in the area 406a of the mask ROM 406 and the program must be patched, patch data is received from the external patch data setting unit through the serial interface unit 409. This patch data is stored in the area 6b of the EEPROM 6 through the interface unit 408b.

The patch data consists of the start address of a bug portion of the program in the area 406a of the mask ROM 406 (this address will be simply referred to as start address hereinafter), an end address of the bug portion of the program (this address will be simply referred to as an end address hereinafter), and a debugged patch program. A jump instruction to the end address of the bug portion of the program in the area 406a of the mask ROM 406 (this address will be simply referred to as an end address hereinafter) is set at the end of the patch program. This patch data is created by the patch data setting unit.

When the program for realizing the function of the selective calling receiver is executed to reach the start address, the patch program is executed without executing the program in the area 406a of the mask ROM 406. The flow returns to the end address upon execution of the last jump instruction of the patch program, so that the program in the area 406a of the mask ROM 406 is executed, thereby correcting the bug of the program in the area 406a of the mask ROM 406.

The RAM 407 has an area 407a serving as a work area in execution of the program for realizing the function of the selective calling receiver and an area 407b for storing the patch program.

The operation of the MPU 4 and hence the operation of the selective calling receiver will be described below.

When the selective calling receiver is powered on, the CPU 401 executes the boot program stored in the area 406b of the mask ROM 406. The boot program initializes the entire selective calling receiver, and at the same time reads the patch data from the area 6b of the EEPROM 6 through the interface unit 408b. Subsequently, the boot program stores the start address in the patch data in the patch register 402 and the patch program in the patch data in the area 407b of the RAM 407.

When no patch data is present in the area 6a of the EEPROM 6, the boot program stores, in the patch register 402, an address at which the CPU 401 cannot execute the patch program.

Upon completion of execution of the boot program, the CPU 401 executes the program in the area 406a of the mask ROM 406.

The execution sequence will be described below.

The CPU 401 outputs the address of an instruction to be executed next to the address bus. The address decoder 405 receives this address from the address bus. If this address is for the mask ROM 406, the address decoder 405 outputs a chip select signal CS1 for selecting the mask ROM 406. However, when the address from the address bus is for the RAM 407, the address decoder 405 outputs a chip select signal CS2 for selecting the RAM 407.

The chip select signals CS1 and CS2 are not directly input to the mask ROM 406 and the RAM 407, but are input to the patch control circuit 404.

When the patch control circuit 404 receives the chip select signal CS1 while it does not receive the coincidence signal s from the comparator 403 (to be described in detail later), the patch control circuit 404 outputs a chip select signal CS1x to the mask ROM 406. Upon reception of the chip select signal CS1x, the mask ROM 406 receives the address from the address bus and outputs the corresponding data (i.e., a program instruction) onto the data bus. The CPU 401 receives the program instruction from the data bus to execute this instruction.

Similarly, when the patch control circuit 404 receives the chip select signal CS2 while it does not receive the coincidence signal s from the comparator 403 (to be described later), the patch control circuit 404 outputs a chip select signal CS2x to the RAM 407. When the RAM 407 receives this chip select signal CS2x, the CPU 401 writes data in the work area 407a of the RAM 407 or reads out the data from the work area 407a.

The comparator 403 receives, from the address bus, the address of the instruction to be executed next, and compares this address with the address stored in the patch register 402. If a coincidence is established, the comparator 403 outputs the coincidence signal s to the patch control circuit 404.

When the patch control circuit 404 receives the coincidence signal s from the comparator 403, the patch control circuit 404 outputs neither the chip select signal CS1x nor the chip select signal CS2x. In this case, the patch control circuit 404 outputs a jump instruction to the start address of the patch program area 407b of the RAM 407 onto the data bus.

The CPU 401 executes this jump instruction and then the patch program in the patch program area 407b of the RAM 407. As described above, since a jump instruction to the end address of the bug portion of the program in the area 406a of the mask ROM 406 is set at the end of the patch program, the program in the area 406a of the mask ROM 406 can be subsequently executed upon completion of the execution of the patch program.

In this embodiment, the patch data is received from the patch data setting unit through the serial interface unit 409 shown in FIG. 5. However, the present invention is not limited to this. Patch data may be received as message information following the selective call number of the selective call signal shown in FIG. 2B and may be stored in the patch data area 6b of the EEPROM 6 shown in FIG. 5.

What is claimed is:

1. A selective calling receiver comprising:

a microprocessor for executing a prestored program;

a non-writable mask ROM containing the prestored program;

a patch register for storing a patch address;

a programmable patch memory for storing a patch program, the patch memory being directly addressable by the microprocessor; and a patch controller for controlling the microprocessor such that when there is a coincidence between the patch address and an instruction fetch address output by the microprocessor, the patch program stored in the patch memory is executed by the microprocessor by directly addressing the patch memory.

2. The selective calling receiver of claim 1, wherein the patch program is executed solely from the patch memory.

3. The selective calling receiver of claim 1, wherein the patch controller further comprises a comparator for detecting the coincidence between the patch address and the instruction fetch address.

4. The selective calling receiver of claim 3, wherein the comparator outputs a coincidence signal to the patch controller when the comparator detects the coincidence between the patch address and the instruction fetch address, and wherein the patch controller is notified of the coincidence detection by the coincidence signal.

5. The selective calling receiver of claim 1, wherein the patch controller outputs a jump instruction for the microprocessor to a start address of the patch program stored in the patch memory.

6. The selective calling receiver of claim 1, wherein a jump instruction to an end address of a bug portion of the prestored program in the ROM is set at an end of the patch program.

7. The selective calling receiver of claim 1, further comprising a patch program source, and wherein the patch memory comprises a RAM connected to the microprocessor via a bus, the microprocessor reads the patch program from the patch program source and stores the patch program in the patch memory RAM, and the microprocessor executes the patch program from the patch memory RAM.

8. The selective calling receiver of claim 7, wherein the patch program source is a ROM.

9. The selective calling receiver of claim 7, wherein the patch program is readable through an interface accessible externally of the selective calling receiver.

10. The selective calling receiver of claim 9, wherein the patch program source is an external patch data setting unit, and wherein the patch data setting unit is connectable to the interface.

11. The selective calling receiver of claim 7, wherein the patch program source is a selective call signal.

12. The selective calling receiver of claim 11, wherein the patch program source comprises a rewritable ROM for storing a selective call number of the selective calling receiver.

13. The selective calling receiver of claim 7, wherein the patch program source comprises message information following a selective call number in a selective call signal.

14. The selective calling receiver of claim 7, wherein the patch program is read from the patch program source and stored in the patch memory RAM when the selective calling receiver is powered on.

15. The selective calling receiver of claim 1, wherein an address value at which the patch program cannot be executed is set in the patch register when no patch program is present in the patch memory.

16. The selective calling receiver of claim 1, wherein the patch memory comprises a rewritable ROM for storing a selective call number of the selective calling receiver.

17. A selective calling receiver comprising:

a microprocessor for executing a prestored program;

a non-writable mask ROM containing the prestored program;

a patch register for storing a patch address;

a programmable patch memory for storing a patch program; and a patch controller for controlling the microprocessor such that when there is a coincidence between the patch address and an instruction fetch address output by the microprocessor, the patch program is executed solely from the patch memory.

* * * * *